United States Patent
Zhao et al.

(10) Patent No.: US 12,404,447 B2
(45) Date of Patent: *Sep. 2, 2025

(54) SINGLE-PHASE RETARDED ACID SYSTEMS USING AMINO ACIDS

(71) Applicant: Schlumberger Technology Corporation, Sugar Land, TX (US)

(72) Inventors: Haiyan Zhao, Sugar Land, TX (US); Murtaza Ziauddin, Katy, TX (US); Philippe Enkababian, Abu Dhabi (AE); Temiloluwa Yusuf, Sugar Land, TX (US); Patrice Abivin, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/691,989

(22) PCT Filed: Nov. 30, 2022

(86) PCT No.: PCT/US2022/051322
§ 371 (c)(1),
(2) Date: Mar. 14, 2024

(87) PCT Pub. No.: WO2023/102001
PCT Pub. Date: Jun. 8, 2023

(65) Prior Publication Data
US 2024/0360356 A1  Oct. 31, 2024

Related U.S. Application Data

(60) Provisional application No. 63/284,547, filed on Nov. 30, 2021.

(51) Int. Cl.
*C09K 8/74* (2006.01)
(52) U.S. Cl.
CPC ............ *C09K 8/74* (2013.01); *C09K 2208/30* (2013.01)
(58) Field of Classification Search
CPC ....... C09K 8/74; C09K 2208/30; E21B 33/16; E21B 33/26
See application file for complete search history.

(56) References Cited

U.S. PATENT DOCUMENTS

| 2,485,529 | A | 10/1949 | Cardwell |
| 3,681,240 | A | 8/1972 | Fast |
| 3,826,312 | A | 7/1974 | Richardson |
| 3,920,566 | A | 11/1975 | Richardson |
| 4,140,640 | A | 2/1979 | Scherubel |
| 4,368,136 | A | 1/1983 | Murphey |
| 4,420,414 | A | 12/1983 | Valone |
| 4,466,893 | A | 8/1984 | Dill |
| 4,702,848 | A | 10/1987 | Payne |
| 4,703,797 | A | 11/1987 | Djabbarah |
| 4,730,676 | A | 3/1988 | Luers |
| 4,747,975 | A * | 5/1988 | Ritter ........................ C02F 5/08 510/508 |
| 4,807,703 | A | 2/1989 | Jennings, Jr. |
| 5,120,471 | A | 6/1992 | Jasinski |
| 5,220,960 | A | 6/1993 | Totten |
| 5,310,002 | A | 5/1994 | Blauch |
| 5,327,973 | A | 7/1994 | Jennings, Jr. |
| 5,547,022 | A | 8/1996 | Juprasert |
| 5,773,024 | A | 6/1998 | Unger |
| 5,990,051 | A | 11/1999 | Ischy |
| 6,117,364 | A | 9/2000 | Vorderbruggen |
| 6,196,318 | B1 | 3/2001 | Gong |
| 6,436,880 | B1 | 8/2002 | Frenier |
| 7,148,184 | B2 | 12/2006 | Francini |
| 7,237,608 | B2 | 7/2007 | Fu |
| 7,350,572 | B2 | 4/2008 | Fredd |
| 7,603,261 | B2 | 10/2009 | Tardy |
| 7,615,516 | B2 | 11/2009 | Yang |
| 7,635,028 | B2 | 12/2009 | Li |
| 7,696,393 | B2 | 4/2010 | Rivers |
| 7,774,183 | B2 | 8/2010 | Tardy |
| 7,833,947 | B1 | 11/2010 | Kubala |
| 7,915,205 | B2 | 3/2011 | Smith |
| 8,163,102 | B1 | 4/2012 | MacDonald |
| 8,551,926 | B2 | 10/2013 | Huang |

(Continued)

FOREIGN PATENT DOCUMENTS

| CN | 105670599 A | 6/2016 |
| CN | 110564398 A | 12/2019 |

(Continued)

OTHER PUBLICATIONS

Search Report and Written Opinion of International Patent Application No. PCT/US2022/051322 dated Apr. 14, 2023, 7 pages.
Examination Report issued in GCC Patent Appl. No. GC 2016-31138 on Jul. 17, 2018; 4 pages.
International Search Report and Written Opinion issued in the PCT Aplication No. PCT/US2016/025967 dated Jul. 14, 2016, 9 pages.
Office Action issued in U.S. Appl. No. 18/305,765 dated Dec. 21, 2023, 18 pages.
International Search Report and Written Opinion issued in International Patent Appl. No. PCT/US2016/049335 on Nov. 17, 2016; 9 pages.
PCT International Preliminary Report on Patentability; Application No. PCT/US2016/049335; Dated Mar. 15, 2018; 8 pages.
Eurasian Office Action issued in Eurasian Patent Application No. 201890638 on Oct. 2, 2018; 6 pages (with English Translation).
Examination Report issued in related GC Application GC 2016-39640 on Jul. 8, 2021; 5 pages.

(Continued)

*Primary Examiner* — Silvana C Runyan
(74) *Attorney, Agent, or Firm* — Jeffrey D. Frantz

(57) ABSTRACT

Treatment of hydrocarbon formations using single-phase aqueous acid blends that contain lysine is described herein. The single-phase aqueous fluid includes one or more strong acid molecules and lysine in water, wherein the one or more strong acid molecules are present in a concentration range of 15 wt % to 28 wt %, based on the weight of the aqueous fluid, and lysine is present in a molar ratio of lysine to the one or more strong acid molecules that is from 1:15 to 1:40, and a viscoelastic surfactant.

20 Claims, 3 Drawing Sheets

(56) References Cited

U.S. PATENT DOCUMENTS

| | | |
|---|---|---|
| 8,580,047 B1 | 11/2013 | MacDonald |
| 8,940,106 B1 | 1/2015 | MacDonald |
| 9,034,806 B2 | 5/2015 | Gurmen |
| 9,085,975 B2 | 7/2015 | Abad |
| 9,376,611 B2 | 6/2016 | Berry |
| 9,573,808 B2 | 2/2017 | Jiang |
| 9,796,490 B2 | 10/2017 | Jiang |
| 9,809,716 B2 | 11/2017 | Beuterbaugh |
| 9,920,606 B2 | 3/2018 | Jiang |
| 10,035,944 B2 | 7/2018 | Purdy |
| 10,131,831 B2 | 11/2018 | Rimassa |
| 10,378,325 B2 | 8/2019 | Panga |
| 10,703,957 B2 | 7/2020 | Al-Yami |
| 10,767,474 B2 | 9/2020 | Feng |
| 10,787,606 B2 | 9/2020 | Weider |
| 10,954,432 B2 | 3/2021 | Panga |
| 10,982,133 B2 | 4/2021 | Purdy |
| 11,091,689 B2 | 8/2021 | Daeffler |
| 11,098,241 B2 | 8/2021 | Purdy |
| 11,168,244 B2 | 11/2021 | Phan |
| 2002/0023752 A1 | 2/2002 | Qu |
| 2002/0147114 A1 | 10/2002 | Dobson |
| 2004/0009880 A1 | 1/2004 | Fu |
| 2004/0129418 A1 | 7/2004 | Jee |
| 2005/0124500 A1 | 6/2005 | Chen |
| 2006/0042797 A1 | 3/2006 | Fredd |
| 2006/0102349 A1 | 5/2006 | Brady |
| 2006/0180308 A1 | 8/2006 | Welton |
| 2007/0235189 A1 | 10/2007 | Milne |
| 2007/0293404 A1 | 12/2007 | Hutchins |
| 2008/0139412 A1 | 6/2008 | Fuller |
| 2008/0200353 A1 | 8/2008 | Dahayanake |
| 2008/0269081 A1 | 10/2008 | Lin |
| 2008/0289828 A1 | 11/2008 | Hutchins |
| 2008/0314594 A1 | 12/2008 | Still |
| 2009/0247431 A1 | 10/2009 | Gupta |
| 2010/0010106 A1 | 1/2010 | Crews |
| 2010/0022418 A1 | 1/2010 | Milne |
| 2010/0224365 A1 | 9/2010 | Abad |
| 2010/0243242 A1 | 9/2010 | Boney |
| 2010/0248996 A1 | 9/2010 | Sawdon |
| 2010/0331223 A1 | 12/2010 | Li |
| 2011/0036583 A1 | 2/2011 | Willberg |
| 2012/0238479 A1 | 9/2012 | Choudhary |
| 2013/0025870 A1 | 1/2013 | Berry |
| 2013/0032345 A1 | 2/2013 | Freese |
| 2013/0261032 A1 | 10/2013 | Ladva |
| 2013/0327531 A1 | 12/2013 | Dahayanake |
| 2014/0116708 A1 | 5/2014 | Wadekar |
| 2014/0166291 A1 | 6/2014 | Friesen |
| 2014/0166589 A1* | 6/2014 | Hicks .............. G01K 7/00 |
| | | 210/742 |
| 2014/0171345 A1 | 6/2014 | Steiner |
| 2014/0174742 A1 | 6/2014 | Mirakyan |
| 2014/0212006 A1 | 7/2014 | Zhao |
| 2014/0246198 A1* | 9/2014 | Pandya .............. E21B 43/27 |
| | | 166/305.1 |
| 2014/0256604 A1 | 9/2014 | Wadekar |
| 2014/0329725 A1 | 11/2014 | Karale |
| 2014/0367100 A1 | 12/2014 | Oliveira |
| 2015/0034315 A1 | 2/2015 | Jiang |
| 2015/0034318 A1 | 2/2015 | Jiang |
| 2015/0080271 A1 | 3/2015 | De Wolf |
| 2015/0114647 A1 | 4/2015 | Jiang |
| 2015/0200147 A1 | 7/2015 | Lien |
| 2015/0240147 A1 | 8/2015 | Jiang |
| 2015/0260021 A1 | 9/2015 | Reyes |
| 2015/0322762 A1 | 11/2015 | Varadaraj |
| 2015/0344771 A1 | 12/2015 | Jiang |
| 2016/0024370 A1 | 1/2016 | Ba deri |
| 2016/0025895 A1 | 1/2016 | Ziauddin |
| 2016/0146964 A1 | 5/2016 | Badri |
| 2016/0237340 A1 | 8/2016 | Pandya |
| 2016/0298024 A1 | 10/2016 | Panga |
| 2017/0037304 A1 | 2/2017 | Rimassa |
| 2017/0267918 A1 | 9/2017 | Daeffler |
| 2018/0244981 A1 | 8/2018 | Panga |
| 2018/0244982 A1 | 8/2018 | Yakovlev |
| 2018/0273834 A1* | 9/2018 | Qiu .................. C09K 8/72 |
| 2018/0282613 A1 | 10/2018 | Blackbourn |
| 2019/0194528 A1 | 6/2019 | Purdy |
| 2019/0292440 A1 | 9/2019 | Purdy |
| 2020/0224085 A1 | 7/2020 | Purdy |
| 2020/0224086 A1 | 7/2020 | Purdy |
| 2020/0270505 A1 | 8/2020 | Reddy |
| 2020/0318009 A1* | 10/2020 | Purdy .............. C09K 8/528 |
| 2020/0399530 A1 | 12/2020 | Zakaria |
| 2021/0130680 A1 | 5/2021 | Purdy |
| 2021/0189226 A1 | 6/2021 | Purdy |
| 2021/0198561 A1 | 7/2021 | Purdy |
| 2021/0253936 A1 | 8/2021 | Purdy |
| 2021/0277302 A1 | 9/2021 | Qiu |
| 2021/0380872 A1 | 12/2021 | Daeffler |
| 2023/0257645 A1 | 8/2023 | Daeffler |
| 2023/0279284 A1 | 9/2023 | Qiu |
| 2024/0309266 A1 | 9/2024 | Fernandez Del Valle |
| 2025/0059434 A1 | 2/2025 | Daeffler |

FOREIGN PATENT DOCUMENTS

| | | |
|---|---|---|
| EP | 2524017 A1 | 11/2012 |
| KR | 1020200108408 A | 9/2020 |
| RU | 2247833 C1 | 3/2005 |
| WO | 2000019062 A1 | 4/2000 |
| WO | 2004005672 A1 | 1/2004 |
| WO | 2006136262 A1 | 12/2006 |
| WO | 2009077958 A1 | 6/2009 |
| WO | 2011148282 A1 | 12/2011 |
| WO | 2014193546 A1 | 12/2014 |
| WO | 2015020688 A1 | 2/2015 |
| WO | 2015154977 A1 | 10/2015 |
| WO | 2016105996 A1 | 6/2016 |
| WO | 2016164056 A1 | 10/2016 |
| WO | 2017040434 A1 | 3/2017 |
| WO | 2017040553 A1 | 3/2017 |
| WO | 2017040562 A1 | 3/2017 |
| WO | 2018018129 A1 | 2/2018 |
| WO | 2019245983 A1 | 12/2019 |
| WO | 2021126303 A1 | 6/2021 |
| WO | 2023283480 A1 | 1/2023 |
| WO | 2023287746 A1 | 1/2023 |
| WO | 2023049360 A1 | 3/2023 |
| WO | 2023183462 A1 | 9/2023 |
| WO | 2023183465 A1 | 9/2023 |

OTHER PUBLICATIONS

Examination Report issued in the related GC Application GC/2016/31967 dated Nov. 20, 2018 (4 pages).

Third Examination Report issued in the related GC Application GC/2016/31967 dated Feb. 17, 2021, 4 pages.

Eurasian Office Action issued in Eurasian Patent Application No. 201890637 Mar. 27, 2019; 12 pages (with English Translation).

Examination Report issued in the related GC Application GC/2016/31966 dated Nov. 26, 2018 (4 pages).

International Search Report and Written Opinion issued in International Patent Application No. PCT/US2016/049538 on Nov. 10, 2016; 10 pages.

International Preliminary Report on Patentability issued in International Patent Application No. PCT/US2018/024439 on Oct. 10, 2019; 10 pages.

Extended European Search Report issued in European Patent Appl. No. 18776307.3 on Dec. 10, 2020; 9 pages.

Exam Report Issued in Qatar Patent Application No. QA/201909/000510 dated Oct. 29, 2023, 5 pages with English translation.

Office Action issued in Kazakhstan Patent Appl. No. 2019/0788.1 on Nov. 2, 2020; 15 pages (with English translation).

International Search Report and Written Opinion issued in International Patent Appl. No. PCT/US2018/024439 on Jul. 12, 2018; 14 pages.

(56) References Cited

OTHER PUBLICATIONS

Substantive Exam issued in Saudi Arabian Patent Application No. 519410203 dated May 24, 2022, 10 pages with English translation.
Office Action issued in U.S. Appl. No. 18/577,787 dated Nov. 8, 2024, 39 pages.
International Search Report and Writtin Opinion issued in the PCT Application No. PCT/US2022/036641 dated Nov. 4, 2022, 13 pages.
Office Action issued in U.S. Appl. No. 18/689,334 dated Aug. 30, 2024, 10 pages.
Office Action issued in U.S. Appl. No. 18/689,334 dated Jul. 25, 2024, 24 pages.
Search Report and Written Opinion of International Patent Application No. PCT/US2022/044553 dated Jan. 18, 2023, 6 pages.
Search Report and Written Opinion of International Patent Application No. PCT/US2023/016026 dated Jul. 7, 2023, 8 pages.
Search Report and Written Opinion of International Patent Application No. PCT/US2023/016032 dated Jul. 18, 2023, 9 pages.
Al-Ghamdi, A. H.; et al., "Acid Diversion by Use of Viscoelastic Surfactants: The Effects of Flow Rate and Initial Permeability Contrast." SPE 142564, Dec. 2014, SPE Journal, pp. 1203-1216.
Baker, B. D. et al., "Stimulation Practices Using Alcoholic Acidizing and Fracturing Fluids for Gas Reservoirs", SPE-4836-MS presented at the SPE European Spring Meeting, 1974, 7 pages.
Bonn, M. et al., "Suppression of Proton Mobility by Hydrophobic Hydration" J. Am. Chem. Soc. 2009, 131, 17070-17071.
Buijse, M. A, "Understanding wormholing mechanisms can improve acid treatments in carbonate formations", SPE Production Facilities, vol. 15, No. 3, 2000, pp. 168-175.
Callahan, K. M. et al., "Solvation of Magnesium Dication: Molecular Dynamics Simulation and Vibrational Spectroscopic Study of Magnesium Chloride in Aqueous Solution", J. Phys. Chem. A. 2010, 114, pp. 5141-5148.
Chemicalland21, "Lauryl alcohol ethoxlates", http://www.chamicalland21.com/specialtychem/perchem/lauryl%20alcohol%20ethoxylate.htm, Jan. 17, 2015, 5 pages.
Crowe, C.W.; et al., "Investigation of Retarded Acids Provides Better Understanding of Their Effectiveness and Potential Benefits", SPE 18222, SPE Production Engineering, May 1990, pp. 166-170.
Edward et al., "The Dielectric Increments of Amino Acids", J. Am. Chem. Soc. 1974, 96, pp. 902-906.
Fredd, C. N. et al., "Influence of Transport and Reaction on Wormhole Formation in Carbonate Porous Media", AIChE Journal, 1998, 44(9), pp. 1933-1949.
Ghommem, M. et al., "Carbonate Acidizing: Modeling, Analysis, and Characterization of Wormhole Formation and Propagation", Journal of Petroleum Science and Engineering, 2015, 131, pp. 18-33.
Liu, M. et al., "Wormhole Propagation Behavior Under Reservoir Condition in Carbonate Acidizing", Transport in porous Media, 2013, 96(1), pp. 203-220.
Lungwitz, B. et al., "Diversion and Cleanup Studies of Viscoelastic Surfactant-Based Self-Diverting Acid", SPE 86504, SPE International Symposium and Exhibition on Formation Damage Control, Feb. 18-20, 2004, 10 pages.
Mou, J. et al., "Diversion Conditions for Viscoelastic-Surfactant-Based Self-Diversion Acid in Carbonate Acidizing" SPE 173898, May 2015, SPE Production Operations, pp. 121-129.
Panga, M. K. R. et al., "Two-Scale Continuum Model for Simulation of Wormholes in Carbonate Acidization", AlChe J. 2005, 51, pp. 3231-3248.
Petrov, et al., "An Integrated approach to the treatment of the bottom-hole zone of the formation as a method for intensification of production", Scientific and technical journal Georesources, No. 1,(33), 2010, pp. 7-10, 8 pages with machine translation.
Scherubel, G. A. et al., "Foamed Acid, A New Concept in Fracture Acidizing" paper SPE 7568, presented at the Annual Fall Technical Conference and Exhibition, Houston, TX, USA, Oct. 1978, 8 pages.
Tardy, P. M. J. et al., "An Experimentally Validated Wormhole Model for Self-Diverting and Conventional Acids in Carbonate Rocks Under Radial Flow Conditions" paper SPE 107854, presented at the European Formation Damage Conference held in Scheveningen, The Netherlands, May 30-Jun. 1, 2007; 17 pages.
Travalani-Louvisse, A.M. et al., "The use of ethanol in oil well stimulation fluids", Journal of Petroleum Science and Engineering, 1990, 4(3), pp. 257-272.
Wyman, J. "Dielectric Constant: Ethanol-Diethyl Ether and Urea-Water Solutions between 0 and 50", J. Am. Chem. Soc. 1933, 55, pp. 4116-4121.
Xu, J. et al., "On the Origin of Proton Mobility Suppression in Aqueous Solutions in Amphiphiles", J. Phys. Chem. B. 2013, 117, 15426-15435.

\* cited by examiner

SINGLE-PHASE RETARDED ACID SYSTEMS USING AMINO ACIDS

CROSS-REFERENCE TO RELATED APPLICATION

This patent application claims benefit of U.S. Provisional Patent Application No. 63/284,547, filed Nov. 30, 2021, which is entirely incorporated herein by reference.

FIELD

This patent application describes methods and apparatus for stimulating hydrocarbon reservoirs. Specifically, methods and materials for acid treating hydrocarbon formations is described.

BACKGROUND

Almost two-thirds of the world's remaining oil reserves are contained in carbonate reservoirs. Carbonate formations have a tendency to be highly heterogeneous, with complex porosity and permeability variations, barriers, and irregular flow paths. In order to increase the productivity of wells in a calcareous formation, a range of stimulation techniques can be applied. One of the most common techniques involves the stimulation of the well with acids.

Acids can be injected into the formation to boost production or increase injectivity in oil and gas fields. Stimulation of carbonate rocks typically involves the reaction between an acid and the minerals calcite ($CaCO_3$) and dolomite [$CaMg(CO_3)_2$] to enhance the flow properties of the rock. The reaction removes solid material from the rock structure into solution, creating openings in the rock formation for fluid flow.

Optimal acid treatment involves finding a balance between acid reacting too quickly with rock materials, and becoming depleted before openings can be formed, and acid reacting too slowly, causing uniform dissolution of rock material, not formation of openings. To manage the extremes, retarded acid systems are commonly used to extend reactivity of acid such that reactive acid can be delivered into the formation before being expended. One common type of retarded acid is emulsified acid, which is formed by suspending small acid droplets in a continuous hydrocarbon phase to form an emulsion. Emulsified acid can slow down the reaction rate between HCl and carbonate, but emulsions typically have high viscosity and friction pressure, and are challenging to prepare at the wellsite. Single-phase retarded acid systems do not have the challenges of emulsions, but balancing the reactivity of the acid can be challenging. Single-phase acid systems also commonly result in flowback composition with low pH, for example 0 to 3, which can corrode equipment.

Improved single-phase retarded acid systems are needed for stimulation of carbonate reservoirs.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Embodiments described herein provide a single-phase aqueous fluid that has one or more strong acid molecules and lysine in water, wherein the strong acid is present at a concentration in a range of 15 wt % to 28 wt %, based on the weight of the aqueous fluid, and lysine is present in a molar ratio of lysine to the strong acid that is from 1:13 to 1:40.

Other embodiments described herein provide a method of treating a subterranean formation penetrated by a wellbore by preparing a single-phase aqueous fluid having one or more strong acid molecules at a concentration in a range of 15 wt % to 28 wt % and lysine in range of concentration such that a molar ratio of lysine to acid is between 1:13 and 1:40 and contacting the subterranean formation with the single-phase aqueous fluid.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
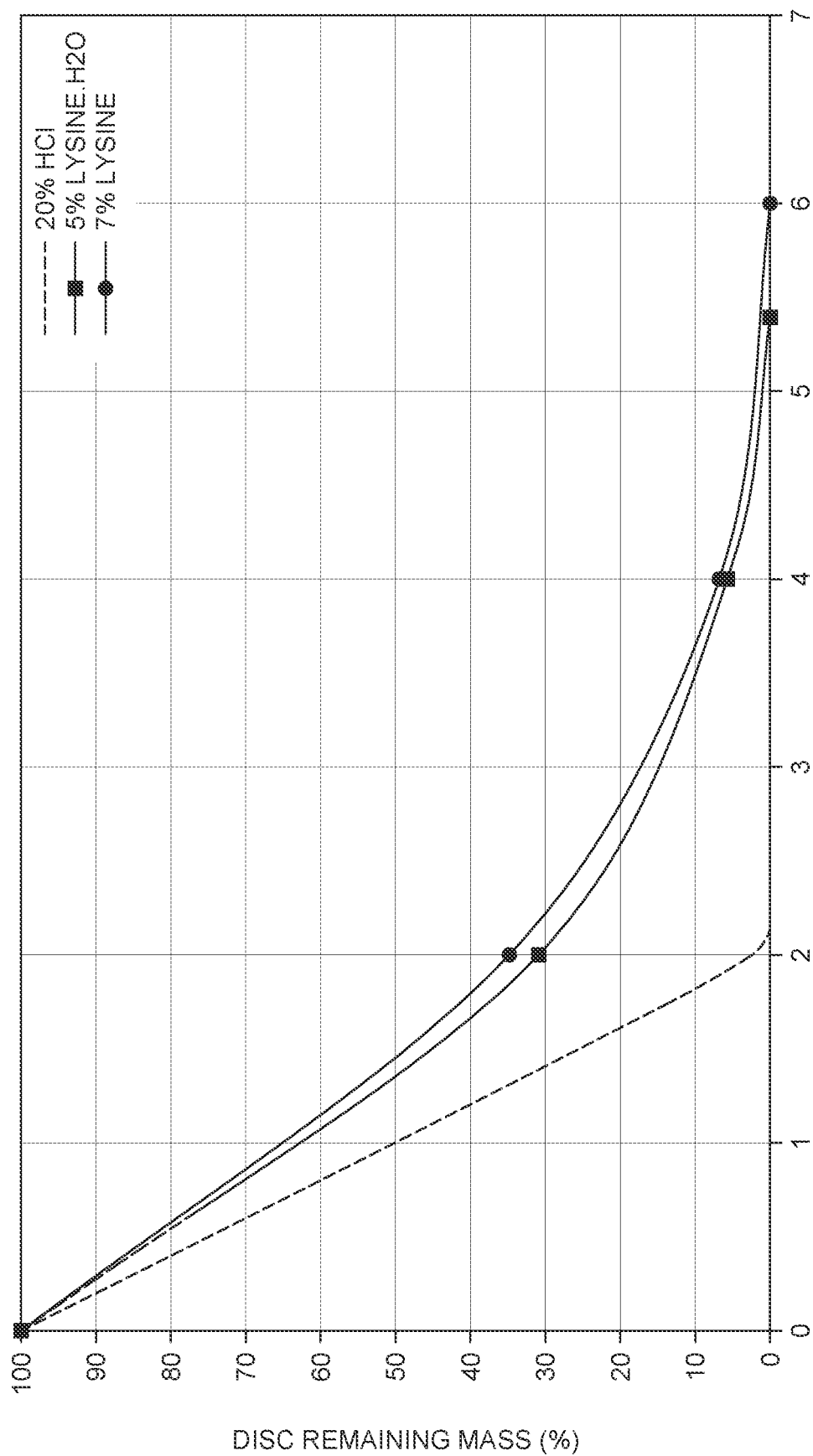
FIG. 1 is a graph showing disc dissolution test results of aqueous fluid containing HCl and 5% L-lysine·$H_2O$ or 7% L-lysine·$H_2O$ compared to an HCl solution, in accordance with embodiments of the present disclosure.

One or more specific embodiments of the present disclosure will be described below. In an effort to provide a concise description of these embodiments, all features of an actual implementation may not be described in the specification. It should be appreciated that in the development of the any such actual implementation, as in any engineering or design project, numerous implementation-specific decisions must be made to achieve the developers' specific goals, such as compliance with system-related and business-related constrains, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Blending one or more strong acid molecules with lysine in an aqueous fluid has been found to yield an acid system with reduced reactivity rate that is useful for acid treating acid-susceptible hydrocarbon reservoirs. Lysine is functional as an acid retardant for strong acid molecules such as hydrogen chloride (HCl, also called hydrochloric acid), hydrogen bromide in water (HBr, also called hydrobromic acid), hydrogen iodide (HI, also called hydroiodic acid), hydrogen fluoride in water (HF, also called hydrofluoric acid), sulfuric acid ($H_2SO_4$), nitric acid ($HNO_3$), phosphoric acid ($H_3PO_4$), an alkanesulfonic acid ($RSO_3H$, where R is an alkyl group), an arylsulfonic acid ($ArSO_3$, where Ar is an aromatic or aryl group), or a combination thereof in water solution. Other amino acids, such as threonine can also be used in similar concentrations as lysine. A mixture of such amino acids can also be used, where the mixture is present in these concentrations. One or more strong acid molecules and lysine, in water solution, form a single-phase aqueous fluid that can be used for acid treatment.

The fluids described herein are retarded acid fluids that can be used to penetrate acid-susceptible formations for acid treatment, and provide flowback compositions that are less corrosive that conventional treatment fluids. For example, where conventional treatment fluids generally result in flowback at pH of 0 to 3, the retarded acid fluids described herein generally provide flowback composition of pH from about 3 to about 5.5, resulting in reduced flowback time. Contacting the single-phase aqueous fluids described herein with a formation susceptible to acid treatment results in a spent acid stream, after reaction of components of the single-phase aqueous fluid with acid reactive components of the formation. Flowback operations, when such single-phase aqueous fluids are used, can be performed without pH treatment of the spent acid stream because the retarding agents of the single-phase aqueous fluids also moderate pH of the spent acid stream. Thus, using the treatment fluids described herein allows flowback operation without using pH mitigation or treatment.

The single-phase aqueous fluids described herein can be used to acid treat a formation with, or without, fracturing the formation. Thus, the single-phase aqueous fluids described herein can be delivered to the formation at a pressure that is more or less than a fracturing pressure of the formation. For example, the single-phase aqueous fluids described herein may be delivered to the formation at a pressure that is above a fracture initiation pressure or a closure pressure of the formation, or the fluids can be delivered at a pressure below fracture pressure for matrix acid treatment.

The strong acid molecule or molecules are generally present in the single-phase aqueous fluid at a concentration in a range of 7.5 wt % to 28 wt %, such as 15 wt % to 28 wt %, for example 20 wt %, based on the weight of the single-phase aqueous fluid, and lysine is generally present in a molar ratio of lysine to the one or more strong acid molecules that is from 1:13 to 1:40, such as from 1:15 to 1:25, for example about 1:20. In some cases, lysine is present in the single-phase aqueous fluid at a concentration of 10 wt %, or 5 wt %, or as low as 2 wt %.

Surfactants can also be used in acid-lysine blends to enhance acid retardation. Surfactants generally occupy sites where acid might react with acid-susceptible species in rock formations. Thus, surfactants can be retarding agents in a retarded acid formulation. Any surfactant that has affinity for acid-susceptible species in rock formations can be used. Such surfactants may be amphoteric, nonionic, cationic, or anionic. Surfactants that can be used include, but are not limited to, betaine-based materials such as erucic amidopropyl dimethyl betaine (EADB) and cocamidopropyl betaine (CAPB); alkyl ammonium bromide materials such as hexadecyltrimethyl ammonium bromide (CTAB, for cetyl trimethyl ammonium bromide) and tetradecyltrimethylammonium bromide (TTAB); and dodecylbenzene sulfonic acid. Combinations of surfactants can be used to tune the effect of acid and alcohol on the acid-susceptible species of the rock formation. The surfactant, or combination of surfactants, is generally added to a mixture of acid to complete a single-phase treatment mixture. Lysine, or other amino acids as described above, can be added to further enhance acid retardation, as demonstrated by examples below. The retarding agent is generally present in the single-phase aqueous fluid at a concentration of 0.2 wt % to 1.5 wt %, such as 0.5 wt % to 1.0 wt %, for example.

Other components can be added to the single-phase acid mixtures described above for use in acid treatment of hydrocarbon formations. Such components include corrosion inhibitors, friction reducers, iron control reagents, diversion agents, viscosifiers, chelating reagents, solvents, clay stabilizers, and calcium inhibitors. These reagents can be added to the mixture neat or dissolved in water or another compatible solvent. For example, such reagents can be added to an alcohol to form a premix, and the premix can then be added to an acid solution to form a single-phase treatment mixture.

The single-phase aqueous mixtures described above can be used as acid treatment compositions with no further additional components, and can be used in a single-step acid treatment process, wherein the single-phase aqueous mixture consisting of water-miscible components and comprising one or more strong acid molecules, lysine, and a surfactant is pumped into a well to acidify the interior of a hydrocarbon formation adjacent to the well. Additional components can be added to the single-phase aqueous mixture to enhance the properties and performance thereof. Adding these components may result in a multi-phase mixture in some cases, or the mixture may remain single-phase after the additional components are added. Acid treatment mixtures described herein may also be used in multi-step processes that might include pre-treatment operations to flush the formation with flush compositions that may be liquid, gas, or a mixture thereof, and may be aqueous, oleaginous, or a mixture thereof. In some instances, a dilute acid flush may be used prior to acid treatment to remove any unwanted components from the formation prior to acid treatment.

EXAMPLES

To evaluate the performance of single-phase aqueous treatment fluids with HCl, lysine and surfactant, mass loss disc experiments were conducted. The tests were performed at 160° F. The disc and acids were preheated at 160° F. before test. The mass loss experiments used a control fluid of 20 wt % HCl in water to compare to test fluids containing 20 wt % HCl and different concentrations of lysine and surfactants. The mass loss experiments used marble discs of 1 inch diameter and 25 inch thickness, with disc mass recorded every two or three minutes. Coreflow tests were also conducted using limestone and dolomite cores.

FIG. 1 is a graph showing disc dissolution test results of aqueous fluids containing only HCl and 5% or 7% L-lysine·H$_2$O (compared to an HCl solution). As seen in FIG. 1, adding lysine to a 20 wt % HCl solution results in slower dissolution of a marble disc, indicating acid retardation.

Figure 2:
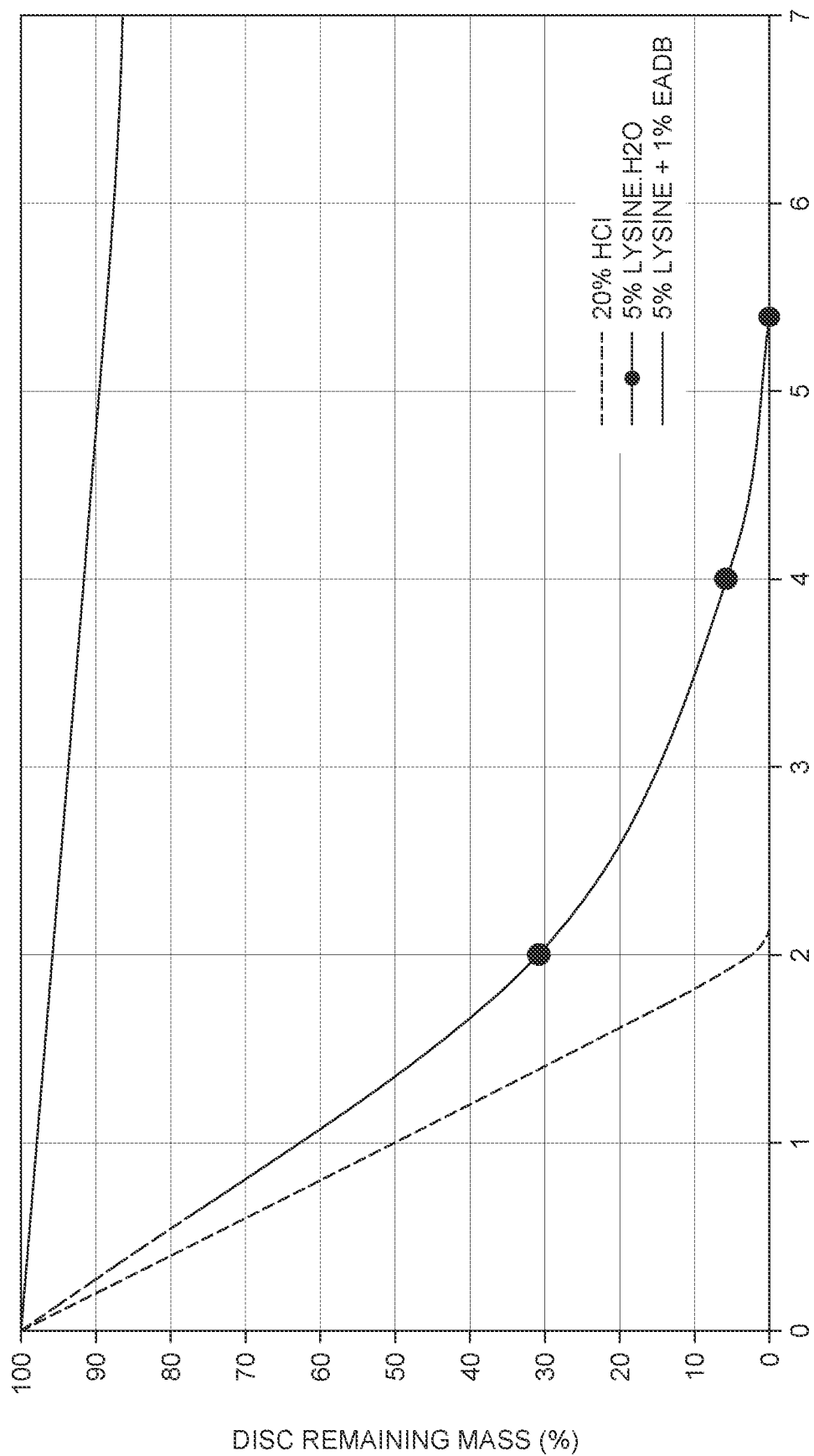
FIG. 2 is a graph showing disc test results of aqueous fluids containing HCl, L-lysine·$H_2O$, and erucic amidopropyl dimethyl betaine (EADB), in accordance with embodiments of the present disclosure.

FIG. 2 is a graph showing disc test results of aqueous fluids containing HCl, L-lysine·H$_2$O, and erucic amidopropyl dimethyl betaine (EADB). As shown in FIG. 2, reaction rate of a solution of 20 wt % HCl and 5 wt % L-lysine·H$_2$O is further retarded by including 1 wt % surfactant.

Coreflow tests are summarized in Table 1. The coreflow test compared the performance of a 20 wt % HCl solution with performance of a 20 wt % HCl solution containing 5 wt % L-lysine·H$_2$O and 1 wt % EADB. Both tests used Indiana limestone cores at 225° F. Table 1 indicates pore volume to breakthrough (PVBT), which is a volume of injection needed to create wormholes in the core. The lower the PVBT, the more efficient the acid system.

TABLE 1

PVBT Values of Retarded and Control Acid Fluids

| Acid System | PVBT |
| --- | --- |
| 20 wt % HCl | 8.3 |
| Retarded acid (20 wt % HCl, 5 wt % L-lysine•H$_2$O, 1 wt % EADB) | 0.43 |

As shown in Table 1, much less (specifically about 95% less) acid treatment fluid volume is needed to create wormholes in the limestone cores using the retarded acid versus the control fluid.

Figure 3:
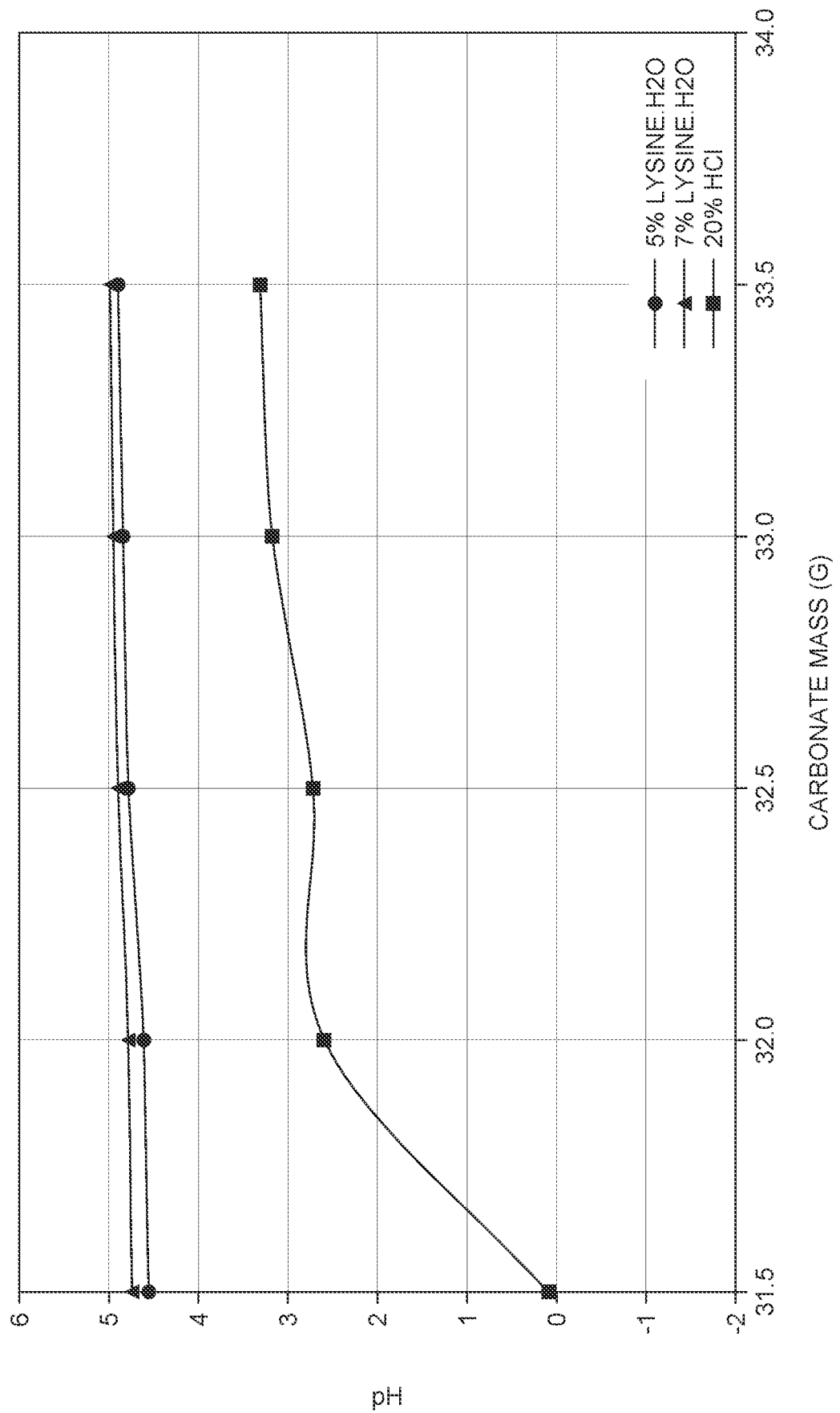
FIG. 3 is a graph showing the pH effect of using lysine in an acid treatment fluid, in accordance with embodiments of the present disclosure.

FIG. 3 is a graph showing the pH effect of using lysine in an acid treatment fluid. As acid is spent in an acid treatment fluid, pH will rise at a rate that indicates how fast the acid is consumed. FIG. 3 compares adding carbonate to a 20 wt % HCl solution, as control, and to a 20 wt % HCl solution containing 5 wt % L-lysine·H$_2$O. Exactly the same amount of carbonate was added into both acids and pH was measured at the same time interval. As shown in FIG. 3, the higher pH of the spent acid is the HCl solution with 5 wt % L-lysine·H$_2$O. Depending on the mass of calcite added, the pH of the 5 wt % lysine solution is 1-2 units of pH higher than the lysine-free solution.

The specific embodiments described above have been illustrated by way of example and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

We claim:

1. A single-phase aqueous fluid, comprising:
    water;
    one or more strong acid molecules, wherein the one or more strong acid molecules are present at a concentration in a range of 15 wt % to 28 wt %, based on the weight of the single-phase aqueous fluid;
    an amino acid component comprising lysine, wherein the amino acid component is present in a molar ratio of the amino acid component to the one or more strong acid molecules that is from 1:15 to 1:40; and
    an acid retarding agent comprising a viscoelastic surfactant, wherein the acid retarding agent is present at a concentration in a range of 0.2 wt % to 1.5 wt %, based on the weight of the single-phase aqueous fluid.

2. The single-phase aqueous fluid of claim 1, wherein the one or more strong acid molecules comprise hydrogen chloride.

3. The single-phase aqueous fluid of claim 1, wherein the one or more strong acid molecules is hydrogen bromide, hydrogen iodide, hydrogen fluoride, sulfuric acid, nitric acid, phosphoric acid, an alkanesulfonic acid, an arylsulfonic acid, or a combination thereof.

4. The single-phase aqueous fluid of claim 1, wherein the viscoelastic surfactant is a cationic surfactant.

5. The single-phase aqueous fluid of claim 1, wherein the viscoelastic surfactant is a betaine surfactant.

6. The single-phase aqueous fluid of claim 1, wherein the amino acid component is present in a molar ratio of the amino acid component to the one or more strong acid molecules that is from 1:15 to 1:25.

7. The single-phase aqueous fluid of claim 1, wherein the viscoelastic surfactant is selected from the group consisting of erucic amidopropyl dimethyl betaine (EADB), hexadecyltrimethyl ammonium bromide (CTAB), tetradecyltrimethylammonium bromide (TTAB), dodecylbenzene sulfonic acid, and combinations thereof.

8. The single-phase aqueous fluid of claim 1, wherein the amino acid component comprises a mixture of lysine and threonine.

9. The single-phase aqueous fluid of claim 1 consisting of the water, the one or more strong acid molecules, the amino acid component, the acid retarding agent, and at least one additional component selected from the group consisting of corrosion inhibitors, friction reducers, iron control reagents, diversion agents, viscosifiers, chelating reagents, solvents, clay stabilizers, and calcium inhibitors.

10. The single-phase aqueous fluid of claim 1 consisting of the water, the one or more strong acid molecules, the amino acid component, and the acid retarding agent.

11. A method of treating a subterranean formation penetrated by a wellbore, the method comprising:
    preparing a single-phase aqueous fluid comprising:
        water;
        one or more strong acid molecules at a concentration in a range of 15 wt % to 28 wt %, based on the weight of the single-phase aqueous fluid;
        an amino acid component comprising lysine, wherein a molar ratio of the amino acid component to the one or more strong acid molecules is from 1:15 to 1:40; and
        an acid retarding agent comprising a viscoelastic surfactant, wherein the acid retarding agent is present at a concentration in a range of 0.2 wt % to 1.5 wt %, based on the weight of the single-phase aqueous fluid; and
    contacting the subterranean formation with the single-phase aqueous fluid, wherein the acid retarding agent cooperates with the amino acid component to retard an acid reaction rate of the one or more strong acid molecules with the subterranean formation.

12. The method of claim 11, wherein the one or more strong acid molecules is hydrogen chloride.

13. The method of claim 11, wherein the one or more strong acid molecules is hydrogen bromide, hydrogen iodide, hydrogen fluoride, sulfuric acid, nitric acid, phosphoric acid, an alkanesulfonic acid, an arylsulfonic acid, or a combination thereof.

14. The method of claim 11, wherein the viscoelastic surfactant is a betaine surfactant.

15. The method of claim 11, wherein the viscoelastic surfactant is a cationic surfactant.

16. The method of claim 11, wherein the molar ratio of the amino acid component to the one or more strong acid molecules is from 1:15 to 1:25.

17. The method of claim 11, further comprising performing a flowback operation using an untreated spent acid stream formed by contacting the single-phase aqueous fluid with the formation.

18. The method of claim 17, wherein performing the flowback operation comprises flowing the untreated spent acid stream to the surface with a pH of about 3 to about 5.5.

19. A method of treating a subterranean formation penetrated by a wellbore, the method comprising:
    preparing a single-phase aqueous fluid comprising:
        water;
        one or more strong acid molecules at a concentration in a range of 15 wt % to 28 wt %, based on the weight of the single-phase aqueous fluid;
        an amino acid component comprising lysine, wherein a molar ratio of the amino acid component to the one or more strong acid molecules is from 1:15 to 1:40; and
        an acid retarding agent comprising a viscoelastic surfactant, wherein the acid retarding agent is present at a concentration in a range of 0.2 wt % to 1.5 wt %, based on the weight of the single-phase aqueous fluid;
    contacting the subterranean formation with the single-phase aqueous fluid, wherein the acid retarding agent cooperates with the amino acid component to retard an acid reaction rate of the one or more strong acid molecules with the subterranean formation;
    forming a spent acid stream by contacting the single-phase aqueous fluid with the formation; and
    performing a flowback operation using the spent acid stream without a pH treatment.

20. The method of claim 19, wherein the acid retarding agent comprises erucic amidopropyl dimethyl betaine (EADB) at a concentration of about 0.5 wt % to about 1.0 wt %, based on the weight of the single-phase aqueous fluid.

* * * * *